United States Patent [19]

Poppelsdorf

[11] 4,247,482

[45] Jan. 27, 1981

[54] PROCESS FOR PRODUCING BIS(N,N-DIALKYLAMINO)ALKYL ETHERS EMPLOYING SULFUR TRIOXIDE VAPOR

[75] Inventor: Fedor Poppelsdorf, Charleston, W. Va.

[73] Assignee: Union Carbide Corporation, New York, N.Y.

[21] Appl. No.: 103,210

[22] Filed: Dec. 13, 1979

Related U.S. Application Data

[63] Continuation-in-part of Ser. No. 025,659, Mar. 30, 1979, abandoned, which is a continuation-in-part of Ser. No. 864,753, Dec. 27, 1977, abandoned.

[51] Int. Cl.$^3$ .................. C07C 85/24; C07C 89/00
[52] U.S. Cl. .................................. 564/508; 546/186; 544/106
[58] Field of Search .................. 260/584 R, 584 C

[56] References Cited

U.S. PATENT DOCUMENTS

| | | | |
|---|---|---|---|
| 2,966,518 | 12/1960 | Johnson | 260/570.7 |
| 3,330,782 | 7/1967 | Poppelsdorf | 260/2.5 |
| 3,400,157 | 9/1968 | Poppelsdorf | 260/584 |
| 3,426,072 | 2/1969 | Warner | 260/584 |
| 3,480,675 | 11/1969 | Poppelsdorf | 260/584 |
| 3,957,875 | 5/1976 | Ferrell et al. | 260/585 |
| 4,177,212 | 12/1979 | Poppelsdorf | 260/584 |

*Primary Examiner*—John Doll
*Attorney, Agent, or Firm*—Richard J. Gallagher

[57] ABSTRACT

A process is provided for producing bis-(N,N-dialkylamino)alkyl ethers of the formula $(R_2NR')_2O$, wherein R is a methyl or ethyl group and R' is a bivalent alkylene group having from 2 to 3 carbon atoms. The novel process is effected by a two-step, preferably "one pot," reaction that utilizes $SO_3$ vapor and $R_2NR'ONa$ as reactants, wherein R and R' are defined above. The resulting bis-ethers are useful as catalysts in the production of polyurethanes, especially cellular polyurethanes.

14 Claims, No Drawings

PROCESS FOR PRODUCING BIS(N,N-DIALKYLAMINO)ALKYL ETHERS EMPLOYING SULFUR TRIOXIDE VAPOR

CROSS-REFERENCE TO RELATED APPLICATIONS

This application is a continuation-in-part of abandoned application Ser. No. 025,659 (which was filed on Mar. 30, 1979 now abandoned), which was in turn a continuation-in-part of abandoned application Ser. No. 864,753 (which was filed on Dec. 27, 1977).

BACKGROUND OF THE INVENTION

1. Field of the Invention

This invention relates to a process for producing bis-(N-N-dialkylamino)alkyl ethers of the formula $(R_2NR')_2O$, where R is a methyl or ethyl group and R' is a bivalent alkylene group having from 2 to 3 carbon atoms. These ethers are useful as catalysts in the production of polyurethanes, especially cellular polyurethanes.

2. Description of the Prior Art

Bis[beta(N,N-dimethylamino)alkyl] ethers, including the commercially important bis[2-(N,N-dimethylamino)ethyl] ether ("BDMEE"), are known to be valuable polyurethane catalysts, particularly in the production of flexible polyurethane foam. By way of illustration, the production of polyurethane foam by reacting an organic isocyanate with an active hydrogen-containing compound (polyol) in the presence of a bis[beta-(N,N-dimethylamino)alkyl] ether catalyst is disclosed in U.S. Pat. No. 3,330,782.

Several processes for the production of bis[beta(N,N-dimethylamino)ethyl] ethers, including BDMEE, are known. One process utilizes di(2-chloroethyl) ether as a reactant as disclosed in U.S. Pat. Nos. 3,400,157 and 3,426,072. However, there are several disadvantages associated with the use of di(2-chloroethyl) ether, including (a) the need to employ comparatively expensive corrosion resistant equipment because of the presence of chlorides in the reaction mixture, (b) disposal problems associated with by-product chlorides, and (c) the relatively high cost and lack of ready availability of di(2-chloroethyl) ether. Another process for the production of bis[beta-(N,N-dimethylamino)alkyl] ethers involves reacting a beta-(N,N-dimethylamino) alkanol, a beta-(N,N-dimethylamino) alkyl chloride and an alkali metal hydroxide using a modified Williamson synthesis as disclosed in U.S. Pat. No. 3,480,675. However, this modified Williamson synthesis has several disadvantages, including (a) several solids-handling steps, (b) a discontinuous mode of operation, (c) disposal problems associated with by-product sodium chloride, and (d) one of the reactants, 2-dimethylaminoethyl chloride, used in the production of BDMEE is an unstable liquid and is also a vesicant which requires special handling. A further process for the production of BDMEE comprises reacting trimethylamine with 2-[2-(N,N-dimethylamino)ethoxy] ethanol in the presence of a nickel catalyst under super-atmospheric pressure as disclosed in U.S. Pat. No. 3,957,875. However, this process requires the use of a costly high-pressure reactor and provides product yields that leave room for improvement. Accordingly, it is desirable to provide a process for the production of bis-(N,N-dialkylamino)alkyl ethers, including BDMEE, that does not possess the disadvantages associated with the above-mentioned processes.

OBJECTS

It is an object of this invention to provide a process for the production of bis-(N,N-dialkylamino)alkyl ethers, including BDMEE, from relatively inexpensive, readily available starting materials.

It is a further object of this invention to provide a process for the production of bis-(N,N-dialkylamino) alkyl ethers that gives improved product yields.

It is another object of this invention to provide a process for the production of bis-(N,N-dialkylamino) alkyl ethers that is essentially a "one pot" process in order to minimize the need for material transfer.

It is still another object of the invention to provide a process for the production of bis-(N,N-dialkylamino)alkyl ethers by a liquid phase reaction that avoids the necessity of solids handling steps.

These and other objects will become apparent from a reading of the following detailed specification.

SUMMARY OF THE INVENTION

The present invention relates to a process for producing a compound of the formula $(R_2NR')_2O$, wherein R is methyl or ethyl group and R' is a bivalent alkylene group having from 2 to 3 carbon atoms, which comprises first, reacting a compound of the formula $R_2NR'OH$ with $SO_3$ vapor and a sodium or potassium base to produce an intermediate compound of the formula $R_2NR'OSO_3X$, wherein X is sodium or potassium, and subsequently, heating the resulting compound of the formula $R_2NR'OSO_3X$ in the presence of a compound of the formula $R_2NR'OX$ to produce the desired compound of the formula $(R_2NR')_2O$.

A preferred process of the invention comprises:

(a) reacting sodio N,N-dialkylaminoalkoxide of the formula $R_2NR'ONa$, wherein R and R' are defined above, with from about 0.1 to about 0.8 (preferably from about 0.40 to about 0.55) moles of $SO_3$ vapor per mole of sodio N,N-dialkylaminoalkoxide at a temperature of up to about 90° C. (preferably from about 20° C. to about 50° C.) in the presence of:

(I) an N,N-dialkylaminoalkanol of the formula $R_2NR'OH$, wherein R and R' are defined above, that is present in an amount such that the molar ratio of sodio N,N-dialkylamino-alkoxide to N,N-dialkylaminoalkanol ranges from about 1:0.5 to about 1:3 and, optionally, (II) an organic diluent/dispersant (preferably in an amount ranging from about 10 to about 50 weight percent based upon the amount of sodio N,N-dialkylaminoalkoxide and N,N-dialkylaminoalkanol employed), to produce an intermediate reaction product mixture, (b) heating the intermediate reaction product mixture from step (a) to an elevated temperature and maintaining said elevated temperature for a time period sufficient to produce bis-(N,N-dialkylamino)alkyl ether, and (c) recovering the bis-(N,N-dialkylamino)alkyl ether.

In another aspect of the present invention, potassio N,N-dialkylaminoalkoxide is employed instead of sodio N,N-dialkylaminoalkoxide in the above specified preferred process.

The bis-(N,N-dialkylamino)alkyl ethers produced in accordance with the process of the present invention are useful as catalysts in the production of cellular polyurethanes. One such catalyst, bis[2-(N,N-dimethylamino)ethyl] ether, is particularly useful in the production of flexible polyurethane foam.

DESCRIPTION OF THE PREFERRED EMBODIMENTS

The reaction according to the process of the present invention is a two-step reaction that can be depicted as follows:

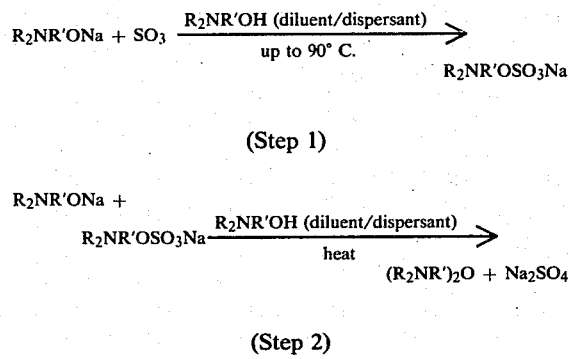

(Step 1)

(Step 2)

wherein R is methyl or ethyl and R' is a bivalent alkylene group having from 2 to 3 carbon atoms. Although the process of the present invention can be carried out continuously, it is preferred to carry it out as a "one-pot" batch process.

The sodio dialkylaminoalkoxide reactant can be produced by reacting sodium hydroxide with N,N-dialkylalkanolamine at about 100° C. and removing the water byproduct by distillation. The sodio dialkylaminoalkoxide reactant can also be prepared by dissolving sodium metal in N,N-dialkylalkanolamine. Useful sodio dialkylaminoalkoxides include, for example, sodio-2-N,N-dimethylaminoethoxide, sodio 1-N,N-dimethylamino-2-propoxide, sodio 3-N,N-dimethylamino-1-propoxide, sodio 2-N,N-diethylaminoethoxide, sodio 1-N,N-diethylamino-2-propoxide, and sodio 3-N,N-diethylamino-1-propoxide. The potassio dialkylaminoalkoxide reactant can be produced by an analogous method (e.g., by reacting potassium hydroxide with N,N-dialkylalkanolamine and removing the water by-product by distillation). Useful potassio dialkylaminoalkoxides would include the potassio analogs of the above-listed sodio compounds such as, for example, potassio-2-N,N-dimethylaminoethoxide and potassio 1-N,N-dimethylamino-2-propoxide.

The sodio dialkylaminoalkoxide reactant is utilized in solution with the corresponding dialkylaminoalkanol (characterized by the formula $R_2NR'OH$, wherein R and R' are defined above) in the reaction mixture. The dialkylaminoalkanol acts as a solvent for the sodio dialkylaminoalkoxide. Thus, for example, sodio 2-N,N-diethylaminoethoxide is used in solution with N,N-diethylethanolamine; sodio 2-N,N-dimethylaminoethoxide is used in solution with N,N-dimethylethanolamine, and sodio 3-N,N-dimethylamino-1-propoxide is used in solution with 3-N,N-dimethylamino-1-propanol. The dialkylaminoalkanol is employed in order to insure that the sodio dialkylaminoalkoxide remains soluble in the reaction mixture during Step 1 of the reaction and does not crystallize out of the mixture. The molar ratio of sodio dialkylaminoalkoxide to the corresponding dialkylaminoalkanol is not narrowly critical and generally ranges from about 1:0.5 to about 1:3 (preferably from about 1:1 to about 1:2). The lower the temperature, the higher the proportion of the dialkylaminoalkanol required to keep the alkoxide in solution. Conversely, as the temperature of Step 1 approaches 90° C., the proportion of alkanol to alkoxide can become less than 1:1. The reaction according to the process of the present invention can alternatively be effected by substituting potassio dialkylaminoalkoxide for sodio dialkylaminoalkoxide.

The organic diluent/dispersant useful in the process of the present invention can serve three functions. First, it acts as a diluent for the sodio dialkylaminoalkoxide reactant, thereby moderating the rate of the sodio dialkylaminoalkoxide/sulfur trioxide reaction and reducing the likelihood of charring during that reaction. Second, it acts as a dispersant and co-solvent (together with the dialkylaminoalkanol) for the sodio dialkylaminoalkoxide, preventing the crystallization of the sodio dialkylaminoalkoxide during Step 1 of the reaction. At high ratios of dialkylaminoalkanol to alkoxide, a large proportion of an organic diluent also could be used without causing precipitation of the contained alkoxide, with the usable limit being dictated by economics. Third, it optionally serves as a "pot-boiler" during recovery of this bis-(N,N-dialkylamino)alkyl ether. Useful diluent/dispersants must both (a) not readily react with sulfur trioxide when incorporated into the reaction mixture and (b) have a boiling point of at least about 90° C. (preferably at least about 100° C.) at atmospheric pressure. Such a boiling point will insure that the reaction will occur within a commercially acceptable time period since the reflux temperature (and, hence, reaction temperature) that is achievable for the reaction mixture is directly related to the boiling point of the diluent/dispersant. In addition, provided that the boiling point of the diluent/dispersant is at least about 10° C. higher than that of the bis-ether product, it will function as a "pot-boiler" for recovery of the bis-ether. For its use as a "pot-boiler," the diluent/dispersant can be added at any stage before the distillation is carried out. Useful diluent/dispersants include straight-chained hydrocarbons such as n-heptane, n-octane and n-tetradecane; mixed straight-chained, mixed branched-chained and mixed straight-chained/branched-chained hydrocarbons having a number of carbon atoms per molecule of from about 6 to about 30; and ethers such as tetrahydrofuran, dioxane, monoglyme and diglyme. Toluene was found to be a unacceptable diluent/dispersant since it readily reacted with a sulfur trioxide reactant.

The amount of diluent/dispersant employed according to the process of the present invention can vary widely depending upon the particular reactants and diluent/dispersant used, as well as upon temperature. Generally, the diluent/dispersant is present in an amount ranging from about 0 to about 60 (preferably 10 to 50) weight percent based on the amount of sodio N,N-dialkylaminoalkoxide and N,N-dialkylaminoalkanol employed in the reaction mixture. When the reaction temperature of choice is in the upper part of the preferred range of 20°–50° C., there results improved solubility of the alkoxide without the necessity of as much organic diluent or any more dialkylaminoalkoxide. When the N,N-dialkylaminoalkanol is employed in a relatively large amount (i.e., an amount such that the molar ratio of sodio N,N-dialkylaminoalkoxide to N,N-dialkylaminoalkanol ranges from about 1:2.5 to about 1:3), the reaction can be effected without employing a diluent/dispersant.

The sulfur trioxide useful in the process of the invention is employed as a vapor in an amount of from about 0.25 to about 0.60 (preferably from about 0.40 to about 0.55) moles of $SO_3$ vapor per mole of sodio N,N-dialkyl aminoalkoxide reactant. Care must be taken in the introduction of sulfur trioxide vapor into the reaction mixture in order to avoid (a) excessive exothermicity with corresponding degradative side reaction and (b) blockages at the site of sulfur trioxide introduction. Preferably, the sulfur trioxide is mixed with an inert diluent such as, for example, nitrogen or argon, prior to introduction into the reaction mixture.

The reaction according to the process of the invention is preferably effected using an apparatus such as that described in Example 1, infra. The design of the scrubber and the positioning of the sulfur trioxide inlet tube are important considerations in the use of such an apparatus. The scrubber should be "self-cleaning", i.e., any solids which form and separate from the reaction mixture will be washed down into the reactor by the liquid in the reaction mixture. Useful scrubber designs include: downwardly-pointing spirally-placed protuberances; a "disk and doughnut" configuration, as employed in the stripping section of an artisan stripper; a "dual-flow" configuration, wherein perforated trays are fixed in a horizontal position in a cylindrical column; and, a series of flat plates placed either horizontally or at a downward angle from the horizontal in a descending spiral fashion. In contrast, the presence of solids in the reaction mixture can cause scrubber blockage if conventional packing materials such as Raschig rings or glass beads are employed in the scrubber. The sulfur trioxide feed line in the above-mentioned apparatus should be above the top of the liquid mixture in the reactor in order to avoid line blockage caused by any solids that might be present or formed in the reaction mixture.

The limits on the reaction time for the process of the invention are not narrowly critical and can vary over a wide range. Because Step 1 of the reaction proceeds rapidly upon addition of the $SO_3$ to the reactor, the time period required for Step 1 is limited solely by the rate of $SO_3$ addition that can be achieved while maintaining the temperature of the reaction mixture within the specified limits. Generally, a suitable time period for Step 1 is from about 0.5 to about 10 hours (preferably from about 0.5 to about 4 hours). Step 2 of the reaction, the reactants are heated to an elevated temperature (preferably from about 100° C. to about 120° C.) for a time period sufficient to produce the bis-(N,N-dialkylamino)alkyl ether product. The time period required for Step 2 is generally from about 1.5 to about 12 hours (preferably from about 1.5 to about 5 hours).

Atmospheric pressure is generally employed in the process of the invention, although super- or sub-atmospheric pressures can be used if desired for some purpose.

Recovery of the bis(N,N-dialkylamino)alkyl ether product can be effected by any known method. The preferred method involves a stripping distillation at the end of the reaction sequence. Using such a technique, the process is clearly a "one-pot" process since product recovery can be made directly from the reactor.

As indicated below in Example 2, the process of this invention can be carried out by alternate procedures.

Broadly, the desired product, which is a compound of the formula $(R_2NR')_2O$, wherein R is a methyl or ethyl group and R' is a bivalent alkylene group having from 2 to 3 carbon atoms, and which is preferably bis(N,N-dimethylaminoethyl)ether, can be prepared by the process which comprises first, reacting a compound of the formula $R_2NR'OH$, preferably 2-(dimethylamino)ethanol, with $SO_3$ vapor and a sodium or potassium base, preferably sodio-2-(dimethylamino) ethoxide, to produce a compound of the formula $R_2NR'OSO_3X$, wherein X is sodium or potassium, which compound is preferably sodio dimethylaminoethylsulfate, and subsequently, heating the resulting compound in the presence of a compound of the formula $R_2NR'OX$, preferably sodio 2-(dimethylamino)ethoxide, to produce a compound of the formula $(R_2NR')_2O$, preferably bis-(2-dimethylaminoethyl)ether.

Thus one can add $SO_3$ vapor to 2-(dimethylamino)ethanol and then add sodio or potassio 2-(dimethylamino)ethoxide to the 2-sulfatoethyldimethylamine (which results from the $SO_3$ addition) in order to produce the sodio or potassio dimethylaminoethylsulfate as described in Example 2. The sodio or potassio base need not be pre-formed sodio or potassio 2-(dimethylamino)ethoxide. For instance, sodium or potassium hydroxide, either solid or aqueous, may be added to a solution of the 2-sulfatoethyldimethylamine in 2-(dimethylamino)ethanol. Conceptually, the sodium or potassium base can be any one, for example, sodium hydride or sodium metal, which will react with the 2-sulfatoethyldimethylamine to form the sodio or potassio dimethylaminoethylsulfate.

In Example 2, the sodio or potassio 2-(dimethylamino)-ethylsulfate intermediate reacts with the remaining sodio 2-(dimethylamino)ethoxide (i.e., that which was not required to produce the 2-sulfatoethyldimethylamine), which results in the formation of the desired product.

If a base such as sodium hydroxide is used in the formation of the sodio 2-(dimethylamino)ethylsulfate, it can also react with the 2-(dimethylamino)ethanol present to form the sodio 2-(dimethylamino)ethoxide which is required to react with the 2-(dimethylamino)ethylsulfate in order to prepare the bis[(2-dimethylamino)ethyl]ether.

As indicated above, the process of the present invention is useful in preparing bis(N,N-dialkylamino)alkyl ethers characterized by the formula $(R_2NR')_2O$ wherein R and R' are defined above. Bis(N,N-dialkylamino)alkyl ethers encompassed by the formula include: bis[beta(N,N-dimethylamino)ethyl] ether, bis[beta(N,N-dimethylamino)-1-methylethyl] ether, bis[beta(N,N-dimethylamino)propyl] ether, bis[3-(N,N-dimethylamino)propyl] ether, bis[beta-(N,N-diethylamino)ethyl] ether, bis[beta(N,N-diethylaminio-1-methylethyl] ether, and bis[beta-(N,N-diethylamino)propyl] ether. The preferred bis(N,N-dialkylamino)alkyl ether is BDMEE. Other tertiary amine-containing bis-ethers, not encompassed by the above formula, that may be produced according to the process of the instant invention include:

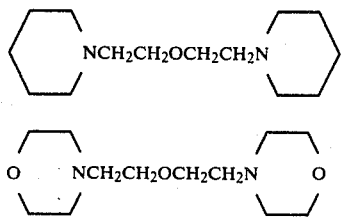

As has been indicated above, such ethers are useful as catalysts in the production of cellular polyurethanes.

The following Examples are illustrative of, but are not intended to limit, the present invention.

EXPERIMENTAL

The following experimental description illustrates the present invention. In the experimental description, the following abbreviations are used:

| Abbreviation | Meaning | | |
|---|---|---|---|
| BDMEE | bis[2-(N,N-dimethylamino)ethyl] ether | | |
| Diluent I | A hydrocarbon mixture consisting of the following composition: | | |
| | Paraffin | | Weight Percent |
| | Normal Paraffin | C12 | 0.02 |
| | " | C13 | 0.49 |
| | " | C14 | 66.95 |
| | " | C15 | 31.79 |
| | " | C16 | 0.53 |
| | Isoparaffins | | 0.22 |
| Diluent II | n-heptane | | |
| Diluent III | n-octane | | |
| percent | weight percent | | |
| mm. | millimeter | | |

EXAMPLE 1

Synthesis of BDMEE using Diluent I

The apparatus consisted of a 3-liter, 4-necked jacketted reactor equipped with a bottom outlet, a scrubber, a mechanical stirrer, a thermometer and a gas inlet tube. The bottom outlet was connected to the inlet of a pump. The outlet of the pump was connected by means of a jacketted circulation line to the top of the scrubber. The scrubber consisted of a glass column containing spirally-placed dimples wherein the dimples pointed downward. Atop the scrubber was located a reflux condenser which was connected to a source of dry nitrogen. The gas inlet tube was connected to a source of sulfur trioxide sparged with nitrogen.

The synthesis of bis[N,N-dimethylamino)ethyl]-ether was carried out as follows: Into the reactor were charged 2.69 moles of sodio 2-(N,N-dimethylamino)ethoxide and 4.44 moles of N,N-dimethylethanolamine at about 50° C. To this mixture was added 464.7 grams of Diluent I. The resulting mixture was cooled to 25° C. with stirring. A small amount of solids formation occurred at this point. With continued stirring, circulation of the mixture through the scrubber was began. A vapor of sulfur trioxide and nitrogen gas, produced by sparging nitrogen through liquid sulfur trioxide at a rate of 80 to 148 cubic centimeters of nitrogen per minute, was passed into the reactor through the gas inlet tube at a rate such that 1.17 moles of sulfur trioxide were added over a period of about three hours while the stirred mixture was maintained at 25° C. After the addition of the entire amount of sulfur trioxide to the reactor, stirring of the reaction mixture was continued for 30 minutes, and then the reaction mixture was heated to a temperature of 115° C. and maintained at that temperature with stirring for three hours. Completion of the reaction was indicated by the reduction of the sodio-2-N,N-dimethylaminoethoxide concentration to a constant low level. The reaction product was distilled through an entrainment separator or short column until the heat temperature reached 130° C. to produce a distillate consisting of N,N-dimethylethanolamine and the BDMEE product in addition to a small amount of Diluent I. Redistillation of this broad-range distillate through a 35-tray Oldershaw column provided BDMEE as a fraction boiling at 88° C. at 25 mm. The yield of BDMEE was between 63 and 68 percent, based on sulfur trioxide employed.

EXAMPLE 2

Synthesis of BDMEE using Diluent I

Using the apparatus of Example 1, 445.5 grams (5.0 moles) of N,N-dimethylethanolamine and 472.5 grams of Diluent I were added to the reactor. The mixture was stirred and circulated through the scrubber. A vapor mixture of sulfur trioxide and nitrogen, produced by sparging nitrogen gas through liquid sulfur trioxide at a rate of about 100 cubic centimeters per minute, was passed into the gas inlet tube of the reactor over a period of about three hours until 1.71 moles of sulfur trioxide had been added to the reactor, while the stirred mixture in the reactor was maintained at 25° C. Upon completion of the addition of sulfur trioxide to the reactor, a hot (65° C.) solution of 3.6 moles of sodio-2-N,N-dimethylaminoethoxide in 5.54 moles of N,N-dimethylethanolamine was added to the stirred mixture in the reactor. The resulting mixture in the reactor was heated to 110° C. and maintained at that temperature with stirring for three hours. The reaction product was distilled at 7 mm pressure through an entrainment separator to remove the BDMEE and excess N,N-dimethylethanolamine. The distillate contained 1.05 moles of BDMEE which represented a yield of 61.4 percent, based on sulfur trioxide employed.

EXAMPLE 3

Synthesis of Bis[2-(N,N-diethylamino)ethyl]ether using Diluent II

Using the apparatus of Example 1, a solution of 2.43 moles of sodio-2-N,N-diethylaminoethoxide in 4.57 moles of N,N-diethylethanolamine at about 50° C. was added to he reactor. To this mixture was added 514 grams of Diluent II. The resulting mixture was cooled to 25° C. with stirring and then circulated through the scrubber. A vapor mixture of sulfur trioxide and nitrogen, produced by sparging nitrogen gas through liquid sulfur trioxide at a rate of about 148 cubic centimeters per minute, was passed into the gas inlet tube of the reactor over a period of about 2 hours and 10 minutes until 1.01 moles of sulfur trioxide has been added to the reactor, while the stirred mixture in the reactor was maintained at about 24° C. Upon completion of the addition of sulfur trioxide to the reactor, the mixture was stirred for one hour and then heated to a reflux temperature of 110° C. The mixture was refluxed with stirring for 11 hours, and then it was cooled and filtered through a kiesel-guhr-coated filter. The filtrate was distilled through a 35-tray Oldershaw column to give 0.39 moles of bis[2-(N,N-diethylamino)ethyl]ether as a fraction boiling at 120° C. at 15 mm. The yield of bis[2-(N,N-diethylamino)ethyl]ether was 39 percent, based on sulfur trioxide employed.

EXAMPLE 4

Synthesis Of Bis[3-(N,N-dimethylamino)propyl]ether using Diluent III

Using the apparatus of Example 1, a solution of 2.35 moles of sodio 3-N,N-dimethylamino-1-propoxide in 4.15 moles of 3-N,N-dimethylamino-1-propanol at about 50° C. was added to the reactor. To this mixture was added 300 grams of Diluent III. The resulting mixture was cooled to 25° C. with stirring and then circulated through the scrubber. A vapor mixture of sulfur trioxide and nitrogen, produced by sparging nitrogen gas through liquid sulfur trioxide at a rate of about 148 cubic centimeters per minute, was passed into the gas inlet tube to the reactor over a period of about 2 hours and 10 minutes until 1.07 moles of sulfur trioxide has been added to the reactor, while the stirred mixture in the reactor was maintained at about 25° C. Upon completion of the addition of sulfur trioxide to the reactor, the mixture was stirred for one hour and then heated to a reflux temperature of 125° C. The mixture was refluxed with stirring for 12 hours, and then it was cooled and filtered through a kielsguhr-coated filter. The filtrate was distilled through a 35-tray Oldershaw column to remove lower-boiling material, and the remaining mixture was distilled through a 10-tray Oldershaw column to give 0.36 moles of bis[3-(N,N-dimethylamino)-propyl]ether as a fraction boiling at 86° to 88° C. at 5 mm. The yield of bis[3-(N,N-dimethylamino)-propyl]ether was 34 percent, based on sulfur trioxide employed.

EXAMPLE 5

Synthesis of Bis[2-(N,N-dimethylamino)-1-methylethyl]ether using Diluent I

Using the apparatus of Example 1, a solution of 2.48 moles of sodio 1,N,N-dimethylamino-2-propoxide in 4.92 moles of 1-N,N-dimethylamino-2-propanol was added to the reactor. To this mixture was added 553 grams of Diluent I. The resulting mixture was cooled to 18° C. with stirring and then circulated through the scrubber. A vapor mixture of sulfur trioxide and nitrogen, produced by sparging nitrogen gas through liquid sulfur trioxide at a rate of about 148 cubic centimeters per minute, was passed into the gas inlet tube of the reactor over a period of about 2 hours until 1.17 moles of sulfur trioxide has been added to the reactor, while the stirred mixture in the reactor was maintained at about 20° C. Upon completion of the addition of sulfur trioxide to the reactor, the mixture was stirred for 30 minutes and then heated to 115° C. The mixture was held at 115° C., with stirring for 2 hours and 45 minutes, and then it was distilled through an entrainment separator at 5 mm pressure in order to produce a distillate containing bis[2-(N,N-dimethylamino)-1-methylethyl]ether, excess of 1-N,N-dimethylamino-2-propanol, and a small amount of Diluent I. Redistillation of this broad range distillate through a 35-tray Oldershaw column provided 0.57 moles of bis[2-(N,N-dimethylamino)-1-methylethyl]ether as a fraction boiling at 115° to 117° C. to 50 mm. The yield of bis[2-(N,N-dimethylamino)-1-methylethyl]ether was 49 percent, based on sulfur trioxide employed.

What is claimed is:

1. A process for producing bis-N,N-dialkylamino)alkyl ether having the formula $(R_2NR')_2O$, wherein R is a methyl or ethyl group and R' is a bivalent alkylene group having from 2 to 3 carbon atoms, which comprises:

(a) reacting sodio N,N-dialkylaminoalkoxide of the formula $R_2NR'ONa$, wherein R and R' are defined above, with from about 0.1 to about 0.8 moles of $SO_3$ vapor per mole of sodio N,N-dialkylaminoalkoxide at a temperature of up to about 90° C. in the presence of:

(I) an N,N-dialkylaminoalkanol of the formula $R_2NR'OH$, wherein R and R' are defined above, that is present in an amount such that the molar ratio of sodio N,N-dialkylaminoalkoxide to N,N-dialkylaminoalkanol ranges from about 1:0.5 to 1:3, and, optionally, (II) an organic diluent/dispersant to produce an intermediate reaction product mixture, (b) heating the intermediate reaction product mixture from step (a) to an elevated temperature and maintaining said elevated temperature for a time period sufficient to produce bis-(N,N-dialkylamino)alkyl ether, and (c) recovering the bis-(N,N-dialkylamino)alkyl ether.

2. A process for producing bis-(N-N-dialkylamino)alkyl ether having the formula $(R_2NR')_2O$, wherein R is a methyl or ethyl group and R' is a bivalent alkylene group having from 2 to 3 carbon atoms, which comprises:

(a) reacting sodio N,N-dialkylaminoalkoxide of the formula $R_2NR'ONa$, wherein R and R' are defined above, with from about 0.25 to about 0.60 moles of $SO_3$ vapor per mole of sodio N,N-dialkylaminoalkoxide at a temperature of from about 20° C. to about 90° C. in the presence of:

(I) an N,N-dialkylaminoalkanol of the formula $R_2NR'OH$, wherein R and R' are defined above, that is present in an amount such that the molar ratio of sodio, N,N-dialkylaminoalkoxide to N,N-dialkylaminoalkanol ranges from about 1:1 to 1:3, and (II) an organic diluent/dispersant in an amount ranging from 0 to about 60 weight percent based on the amount of sodio, N,N-dialkylaminoalkoxide and N,N-dialkylaminoalkanol employed, to produce an intermediate reaction product mixture, (b) heating the intermediate reaction product mixture from step (a) to an elevated temperature and maintaining said elevated temperature for a time period sufficient to produce bis-(N,N-dialkylamino)alkyl ether, and (c) recovering the bis-(N,N-dialkylamino)alkyl ether.

3. The process of claim 1 wherein the amount of $SO_3$ vapor ranges from about 0.40 to about 0.55 moles per mole of sodio N,N-dialkylaminoalkoxide.

4. The process of claim 1 wherein (a) is carried out a temperature of from about 20° C. to about 50° C.

5. The process of claim 1 wherein the organic diluent/dispersant is employed in an amount of from about 10 to about 50 weight percent based on the amount of sodio N,N-dialkylaminoalkoxide and N,N-dialkylaminoalkanol employed.

6. The process of claim 1 wherein the molar ratio of sodio N,N-dialkylaminoalkoxide to N,N-dialkylaminoalkanol is from about 1:1 to about 1:2.

7. The process of claim 1 wherein the bis-(N,N-dialkylamino)alkyl ether is bis[beta-(N,N-dimethylamino)ethyl] ether, the sodio N,N-dialkylaminoalkoxide is sodio 2-N,N-dimethylaminoethoxide, the N,N-dialkylaminoalkanol is N,N-dimethylethanol amine, and the diluent/dispersant is a mixture of aliphatic hydrocarbons having from about 6 to about 30 carbon atoms.

8. The process of claim 1 wherein the bis-(N,N-dialkylamino)alkyl ether is bis[beta-(N,N-diethylamino)ethyl] ether, the sodio N,N-dialkylaminoalkoxide is sodio 2-N,N-diethylaminoethoxide, the N,N-dialkyaminoalkanol is N,N-diethylethanolamine, and the diluent/dispersant is a mixture of aliphatic hydrocarbons having from about 6 to about 30 carbon atoms.

9. The process of claim 1 wherein the bis-(N,N-dialkylamino)alkyl ether is bis[3-(N,N-dimethylamino)propyl] ether, the sodio N,N-dialkylaminoalkoxide is sodio 3N,N-dimethylamino-1propoxide, the N,N-dialkylaminoalkanol is 3-N,N-dimethylamino-1propanol, and the diluent/dispersant is n-octane.

10. The process of claim 1 wherein the bis-(N,N-dialkylamino)alkyl ether is bis[beta(N,N-dimethylamino)-1-methylethyl] ether, the sodio N,N-dialkylaminoalkoxide is sodio 1-N,N-dimethylamino-2-propoxide, the N,N-dialkylaminoalkanol is 1-N,N-dimethylamino-2-propanol, and the diluent/dispersant is a mixture of aliphatic hydrocarbons having from about 6 to about 30 carbon atoms.

11. A process which comprises:
(a) reacting sodio 2-N,N-dimethylaminoethoxide, with from about 0.40 to about 0.55 moles of $SO_3$ vapor per mole of sodio N,N-dimethylaminoethoxide at a temperature of from about 20° C. to about 50° C. in the presence of:
 (I) N,N-dimethylethanolamine in an amount sufficient to produce a molar ratio of sodio 2-N,N-dimethylaminoethoxide to N,N-dimethylethanolamine of from about 1:0.5 to about 1:3.
 (II) an organic diluent/dispersant in an amount ranging from about 10 to about 50 weight percent based on the amount of sodio 2-N,N-dimethylaminoethoxide and N,N-dimethylethanolamine, for a time period sufficient to produce an intermediate reaction product mixture,
(b) heating the intermediate reaction product mixture from step (a) to an elevated temperature and maintaining said elevated temperature for a time period sufficient to produce bis[2-(N,N-dimethylamino)ethyl]ether, and
(c) recovering the bis[2-(N,N-dimethylaminoethyl]ether.

12. A process for producing bis-N,N-dialkylamino)alkyl ether having the formula $(R_2NR')_2O$, wherein R is a methyl or ethyl group and R' is a bivalent alkylene group having from 2 to 3 carbon atoms, which comprises:
(a) reacting potassio N,N-dialkylaminoalkoxide of the formula $R_2NR'OK$, wherein R and R' are defined above, with from about 0.1 to about 0.8 moles of $SO_3$ vapor per mole of potassio, N,N-dialkylaminoalkoxide at a temperature of up to about 90° C. in the presence of:
 (I) an N,N-dialkylaminoalkanol of the formula $R_2NR'OH$, wherein R and R' are defined above, that is present in an amount such that the molar ratio of potassio N,N-dialkylaminoalkoxide to N,N-dialkylaminoalkanol ranges from about 1:0.5 to 1:3, and, optionally,
 (II) an organic diluent/dispersant to produce an intermediate reaction product mixture,
(b) heating the intermediate reaction product mixture from step (a) to an elevated temperature and maintaining said elevated temperature for a time period sufficient to produce bis-(N,N-dialkylamino)alkyl ether, and
(c) recovering the bis-(N,N-dialkylamino)alkyl ether.

13. A process for producing a compound of the formula $(R_2NR')_2O$, wherein R is a methyl or ethyl group and R' is a bivalent alkylene group having from 2 to 3 carbon atoms, which comprises
first, reacting a compound of the formula $R_2NR'OH$, wherein R and R' are as defined above, with $SO_3$ vapor and a sodium or potassium base to produce a compound of the formula $R_2NR'OSO_3X$, wherein R and R' are as defined above and X is sodium or potassium, and
subsequently, heating the resulting compound of the formula $R_2NR'OSO_3X$ wherein R,R' and X are as defined above in the presence of a compound of the formula $R_2NR'OX$ wherein R,R', and X, are as defined above to produce a compound of the formula $(R_2NR')_2O$ wherein R and R' are as defined above.

14. A process for producing bis(N,N-dimethylamino)ethyl)ether which comprises
first, reacting dimethylaminoethanol with $SO_3$ vapor and a sodium base to produce sodio dimethylaminoethylsulfate, and
subsequently, heating the resulting sodium dimethylaminoethylsulfate in the presence of sodium dimethylaminoethoxide to produce bis(N,N-dimethylaminoethyl)ether.

* * * * *